US012812040B2

(12) United States Patent
Deppe et al.

(10) Patent No.: US 12,812,040 B2
(45) Date of Patent: Nov. 24, 2026

(54) METHOD AND SYSTEM FOR FORECASTING SERVICE LEVEL INDICATOR METRICS FOR ANOMALY DETECTION

(71) Applicant: JPMorgan Chase Bank, N.A., New York, NY (US)

(72) Inventors: David Deppe, Little Elm, TX (US); Hrudai Battini, Princeton, NJ (US); Makarand Bhalekar, Plano, TX (US); Ramya Lekha Arcot Bhasker, Powell, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 142 days.

(21) Appl. No.: 18/830,192

(22) Filed: Sep. 10, 2024

(65) Prior Publication Data

US 2026/0075141 A1 Mar. 12, 2026

(51) Int. Cl.
*H04M 3/51* (2006.01)
*H04M 3/523* (2006.01)

(52) U.S. Cl.
CPC ....... *H04M 3/5175* (2013.01); *H04M 3/5238* (2013.01); *H04M 2201/42* (2013.01)

(58) Field of Classification Search
CPC ............. H04M 3/5175; H04M 3/5238; H04M 2201/42
See application file for complete search history.

(56) References Cited

U.S. PATENT DOCUMENTS

| | | | | |
|---|---|---|---|---|
| 8,811,597 B1 * | 8/2014 | Hackbarth | ....... | G06Q 10/06393 379/266.08 |
| 11,368,588 B1 * | 6/2022 | Johnston | ................ | G06N 20/00 |
| 2026/0030069 A1 * | 1/2026 | Marchi | ................... | G06F 9/505 |

* cited by examiner

*Primary Examiner* — Amal S Zenati
(74) *Attorney, Agent, or Firm* — GREENBLUM & BERNSTEIN, P.L.C.

(57) ABSTRACT

Various methods and processes, apparatuses or systems, and media for forecasting of service level indicator (SLI) metrics using deep learning algorithms in order to detect anomalies and to provide accurate alerts to users are disclosed. The method includes: receiving information that relates to an incoming call volume for a particular queue from among a set of queues; analyzing, by using a model, the first information in order to determine a set of SLI metrics that relate to the queue; generating a forecast of one or more of the SLI metrics for the queue; and displaying, via a graphical user interface, information that relates to the forecast.

17 Claims, 4 Drawing Sheets

400

400

METHOD AND SYSTEM FOR FORECASTING SERVICE LEVEL INDICATOR METRICS FOR ANOMALY DETECTION

TECHNICAL FIELD

This disclosure relates to methods and apparatuses for forecasting of service level indicator metrics using deep learning algorithms in order to detect anomalies and to provide accurate alerts to users.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

In the fast-paced environment of large-scale contact centers, the number of calls in a queue is a critical indicator of customer service and operational excellence. Multiple variables can impact how many calls are waiting in the queue, including the number of specialists currently staffed, the volume of calls received, the efficiency of the system in routing calls to the appropriate queue, and the proper functioning of interactive voice response (IVR) self-service tools.

Contact center service levels may be evaluated using various key performance indicators (KPIs), such as the number of calls in the queue, the expected wait time in the queue, the duration of the oldest call waiting in the queue, the average speed of an answered call, and the handling time of a call. These KPIs have close dependencies on each other, and any variation in one may impact many others. Further, these KPIs may be influenced by numerous internal and external factors, such as the time of day, the day of the month, seasonal events, and outages in internal and/or external applications used by an organization associated with the contact center. In addition, detecting anomalies or deviations from the norm in large numbers of queues in a particular contact center may be complex, because each type of queue may have different service level measurements based on the business needs of the queue.

Accordingly, there is a need for a mechanism for an advanced predictive tool to efficiently detect anomalies and optimize resource allocation.

SUMMARY

The present disclosure, through one or more of its various aspects, embodiments, and/or specific features or sub-components, provides, among other features, various systems, servers, devices, methods, media, programs, and platforms for forecasting of service level indicator (SLI) metrics using deep learning algorithms in order to detect anomalies and to provide accurate alerts to users.

According to an aspect of the present disclosure, a method for forecasting of SLI metrics with respect to a customer contact center is provided. The method may be implemented by at least one processor. The method includes: receiving first information that relates to an incoming call volume for a first queue from among a plurality of queues; analyzing, by using a first model, the first information in order to determine a plurality of SLI metrics that relate to the first queue; generating a forecast of a first SLI metric from among the plurality of SLI metrics for the first queue; and displaying, via a graphical user interface, information that relates to the forecast.

The method may further include: detecting, based on the forecast, an anomaly that relates to the first queue; generating an alert that relates to the anomaly; and transmitting the alert to a predetermined user.

The plurality of SLI metrics may include at least two from among the incoming call volume, a number of calls waiting to be answered, a number of specialists currently on duty, an expected wait time in the queue, a duration of an oldest call in the queue, an average handling time of a call, an efficiency of routing calls to a queue, and an effectiveness of an interactive voice response (IVR) self-service tool.

The first information may include the incoming call volume during a predetermined time interval, a time of day, a day of the week, information that relates to a seasonal event, and information that relates to an outage in at least one application from among a predetermined plurality of applications.

The first model may include one from among a Long Short-Term Memory (LSTM) model, a Recurrent Neural Network (RNN) model, a Convolutional Neural Network (CNN) model, a multi-step dense model, and a linear regression model.

The plurality of queues may include at least five hundred (500) queues and may include at least one from among a private banking queue and a retail servicing queue.

The first model may be trained by using historical data that is collected at ten-minute intervals over a thirty day period.

The method may further include: prior to the analyzing, applying a respective Z-score transformation to each numerical data point included in the first information.

According to another embodiment, a computing apparatus for forecasting of SLI metrics with respect to a customer contact center is provided. The computing apparatus includes a processor; a memory; a display; and a communication interface coupled to each of the processor, the memory, and the display. The processor is configured to: receive, via the communication interface, first information that relates to an incoming call volume for a first queue from among a plurality of queues; analyze, by using a first model, the first information in order to determine a plurality of SLI metrics that relate to the first queue; generate a forecast of a first SLI metric from among the plurality of SLI metrics for the first queue; and cause the display to display, via a graphical user interface, information that relates to the forecast.

The processor may be further configured to: detect, based on the forecast, an anomaly that relates to the first queue; generate an alert that relates to the anomaly; and transmit the alert via the communication interface to a predetermined user.

The plurality of SLI metrics may include at least two from among the incoming call volume, a number of calls waiting to be answered, a number of specialists currently on duty, an expected wait time in the queue, a duration of an oldest call in the queue, an average handling time of a call, an efficiency of routing calls to a queue, and an effectiveness of an IVR self-service tool.

The first information may include the incoming call volume during a predetermined time interval, a time of day, a day of the week, information that relates to a seasonal event, and information that relates to an outage in at least one application from among a predetermined plurality of applications.

The first model may include one from among a Long Short-Term Memory (LSTM) model, a Recurrent Neural Network (RNN) model, a Convolutional Neural Network (CNN) model, a multi-step dense model, and a linear regression model.

The plurality of queues may include at least five hundred (500) queues and may include at least one from among a private banking queue and a retail servicing queue.

The first model may be trained by using historical data that is collected at ten-minute intervals over a thirty day period.

The processor may be further configured to: prior to the analysis, apply a respective Z-score transformation to each numerical data point included in the first information.

According to yet another embodiment, a non-transitory computer readable storage medium storing instructions for forecasting of SLI metrics with respect to a customer contact center is provided. The storage medium includes a set of executable code which, when executed by a processor, causes the processor to: receive first information that relates to an incoming call volume for a first queue from among a plurality of queues; analyze, by using a first model, the first information in order to determine a plurality of SLI metrics that relate to the first queue; generate a forecast of a first SLI metric from among the plurality of SLI metrics for the first queue; and display, via a graphical user interface, information that relates to the forecast.

When executed, the executable code may further cause the processor to: detect, based on the forecast, an anomaly that relates to the first queue; generate an alert that relates to the anomaly; and transmit the alert to a predetermined user.

The plurality of SLI metrics may include at least two from among the incoming call volume, a number of calls waiting to be answered, a number of specialists currently on duty, an expected wait time in the queue, a duration of an oldest call in the queue, an average handling time of a call, an efficiency of routing calls to a queue, and an effectiveness of an IVR self-service tool.

The first information may include the incoming call volume during a predetermined time interval, a time of day, a day of the week, information that relates to a seasonal event, and information that relates to an outage in at least one application from among a predetermined plurality of applications.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
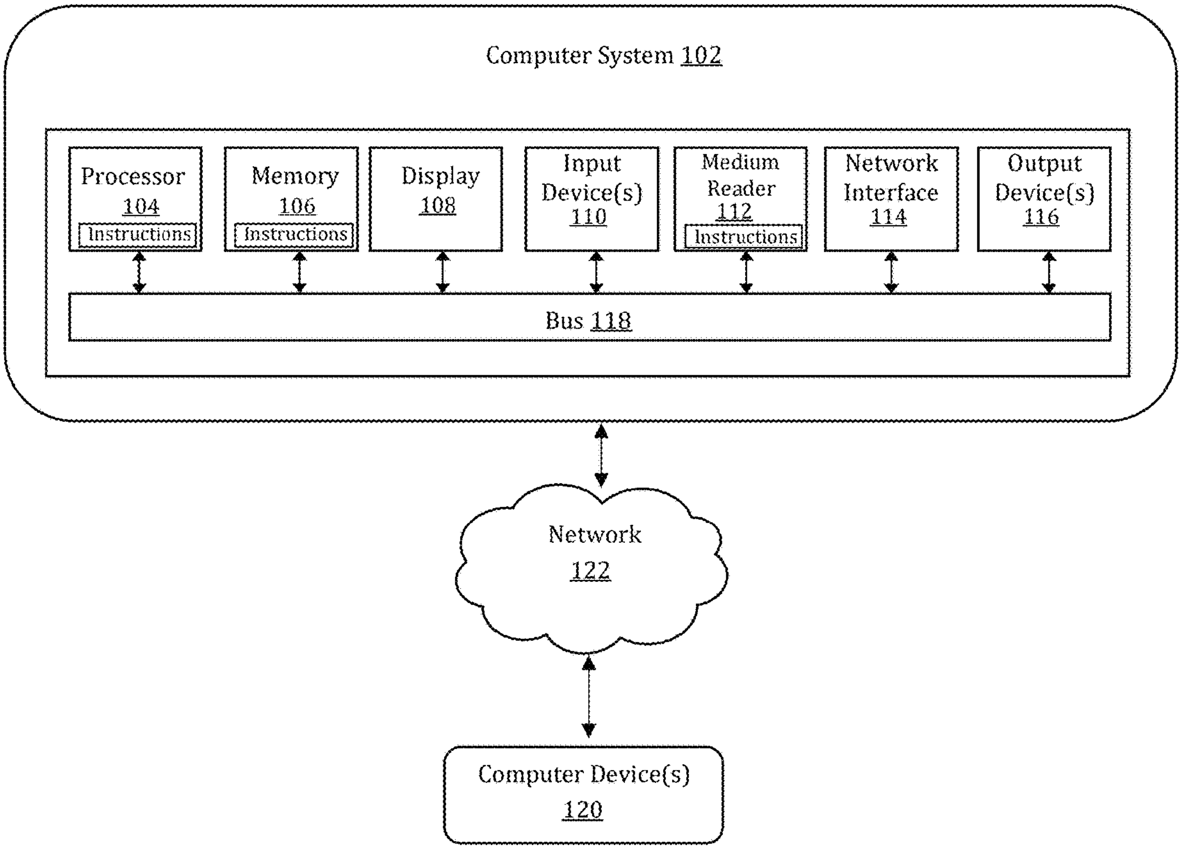
FIG. 1 illustrates a computer system for implementing a method for forecasting of service level indicator metrics using deep learning algorithms in order to detect anomalies and to provide accurate alerts to users, in accordance with an embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a method for forecasting of service level indicator metrics using deep learning algorithms in order to detect anomalies and to provide accurate alerts to users, in accordance with an embodiment. The system 100 is generally shown and may include a computer system 102, which is generally indicated.

The computer system 102 may include a set of instructions that may be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions may be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a GPS device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, may be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In some embodiments, the modules implemented by the system 100 may be platform, language, database, and cloud agnostic that may allow for consistent easy orchestration and passing of data through various components to output a desired result regardless of platform, browser, language, database, and cloud environment by writing programs accordingly. The configuration or data files, in some embodiments, may be written using JavaScript Object Notation (JSON), but the disclosure is not limited thereto. For example, the configuration or data files may easily be extended to other readable file formats such as Extensible Markup Language (XML), YAML Ain't Markup Language (YAML), etc., or any other configuration-based languages.

In accordance with various embodiments of the present disclosure, the methods described herein may be implemented using a hardware computer system that executes software programs. Further, in a non-limited embodiment, implementations can include distributed processing, component/object distributed processing, and an operation mode having parallel processing capabilities. Virtual computer system processing may be constructed to implement one or more of the methods or functionality as described herein, and a processor described herein may be used to support a virtual processing environment.

Figure 2:
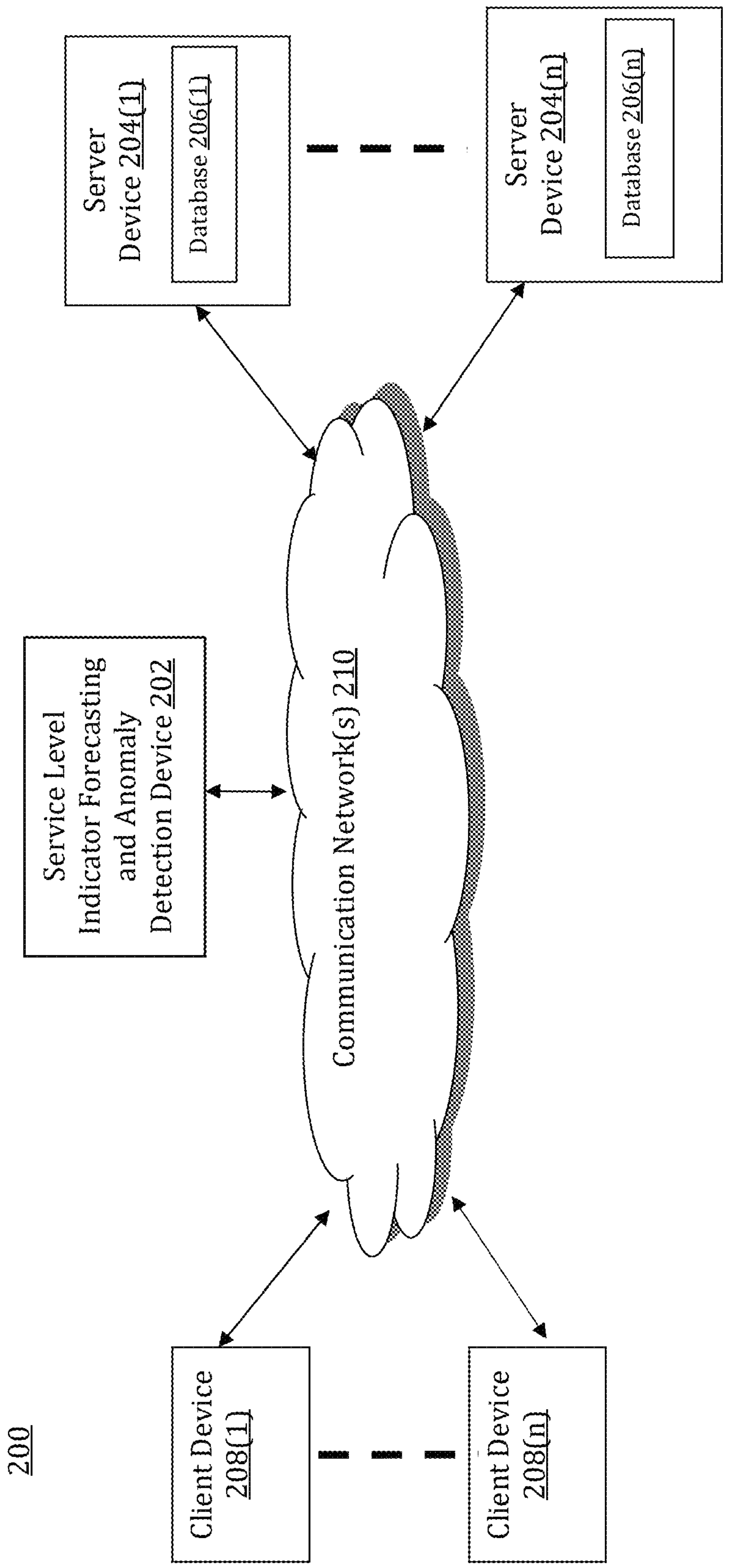
FIG. 2 illustrates an exemplary diagram of a network environment with a device for forecasting of service level indicator metrics using deep learning algorithms in order to detect anomalies and to provide accurate alerts to users, in accordance with an embodiment.

Referring to FIG. 2, a schematic of an exemplary network environment 200 for implementing a service level indicator forecasting and anomaly detection device (SLIFADD) of the instant disclosure is illustrated.

In some embodiments, the above-described problems associated with conventional tools may be overcome by implementing an SLIFADD 202 as illustrated in FIG. 2 that may be configured for implementing a method for forecasting of service level indicator metrics using deep learning algorithms in order to detect anomalies and to provide accurate alerts to users, but the disclosure is not limited thereto.

The SLIFADD 202 may have one or more computer system 102*s*, as described with respect to FIG. 1, which in aggregate provide the necessary functions.

The SLIFADD 202 may store one or more applications that can include executable instructions that, when executed by the SLIFADD 202, cause the SLIFADD 202 to perform actions, such as to transmit, receive, or otherwise process network messages, for example, and to perform other actions described and illustrated below with reference to the figures. The application(s) may be implemented as modules or components of other applications. Further, the application(s) may be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SLIFADD 202 itself, may be located in virtual server(s) running in a cloud-based computing environment rather than being tied to one or more specific physical network computing devices. Also, the application(s) may be running in one or more virtual machines (VMs) executing on the SLIFADD 202. Additionally, in one or more embodiments of this technology, virtual machine(s) running on the SLIFADD 202 may be managed or supervised by a hypervisor.

In the network environment 200 of FIG. 2, the SLIFADD 202 is coupled to a plurality of server devices 204(1)-204 (*n*) that hosts a plurality of databases 206(1)-206 (*n*), and also to a plurality of client devices 208(1)-208(*n*) via communication network(s) 210. A communication interface of the SLIFADD 202, such as the network interface 114 of the computer system 102 of FIG. 1, operatively couples and communicates between the SLIFADD 202, the server devices 204(1)-204 (*n*), and/or the client devices 208(1)-208(*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SLIFADD 202, the server devices 204(1)-204 (*n*), and/or the client devices 208(1)-208(*n*) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SLIFADD 202 may be a standalone device or integrated with one or more other devices or apparatuses, such as one or more of the server devices 204(1)-204 (*n*), for example. In one particular example, the SLIFADD 202 may be hosted by one of the server devices 204(1)-204 (*n*), and other arrangements are also possible. Moreover, one or more of the devices of the SLIFADD 202 may be in the same or a different communication network including one or more public, private, or cloud networks, for example.

The plurality of server devices 204(1)-204 (*n*) may be the same or similar to the computer system 102 or the computer device 120 as described with respect to FIG. 1, including any features or combination of features described with respect thereto. For example, any of the server devices 204(1)-204 (*n*) may include, among other features, one or more processors, a memory, and a communication interface, which are coupled together by a bus or other communication link, although other numbers and/or types of network devices may be used. The server devices 204(1)-204 (*n*) in this example may process requests received from the SLIFADD 202 via the communication network(s) 210 according to the HyperText Transfer Protocol (HTTP)-based and/or JSON protocol, for example, although other protocols may also be used.

The server devices 204(1)-204 (*n*) may be hardware or software or may represent a system with multiple servers in a pool, which may include internal or external networks. The server devices 204(1)-204 (*n*) hosts the databases 206(1)-206 (*n*) that are configured to store various types of data.

Although the server devices 204(1)-204 (*n*) are illustrated as single devices, one or more actions of each of the server devices 204(1)-204 (*n*) may be distributed across one or more distinct network computing devices that together comprise one or more of the server devices 204(1)-204 (*n*). Moreover, the server devices 204(1)-204 (*n*) are not limited to a particular configuration. Thus, the server devices 204 (1)-204 (*n*) may contain a plurality of network computing devices that operate using a master/slave approach, whereby one of the network computing devices of the server devices 204(1)-204 (*n*) operates to manage and/or otherwise coordinate operations of the other network computing devices.

The server devices 204(1)-204 (*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204 (*n*) or other client devices 208(1)-208(*n*).

In some embodiments, the client devices 208(1)-208(*n*) in this example may include any type of computing device that can facilitate the implementation of the SLIFADD 202 that may efficiently provide a platform for implementing a method for forecasting of service level indicator metrics using deep learning algorithms in order to detect anomalies and to provide accurate alerts to users, but the disclosure is not limited thereto.

The client devices 208(1)-208(*n*) may run interface applications, such as standard web browsers or standalone client applications, which may provide an interface to communicate with the SLIFADD 202 via the communication network(s) 210 in order to communicate user requests. The client devices 208(1)-208(*n*) may further include, among other features, a display device, such as a display screen or touchscreen, and/or an input device, such as a keyboard, for example.

Although the exemplary network environment 200 with the SLIFADD 202, the server devices 204(1)-204 (*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the SLIFADD 202, the server devices 204(1)-204 (*n*), or the client devices 208(1)-208(*n*), for example, may be configured to operate as virtual instances on the same physical machine. For example, one or more of the SLIFADD 202, the server devices 204(1)-204 (*n*), or the client devices 208(1)-208(*n*) may operate on the same physical device rather than as separate devices communicating through communication network(s) 210. Additionally, there may be more or fewer SLIFADDs 202, server devices 204(1)-204 (*n*), or client devices 208(1)-208(*n*) than illustrated in FIG. 2. In some embodiments, the SLIFADD 202 may be configured to send code at run-time to remote server devices 204(1)-204 (*n*), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
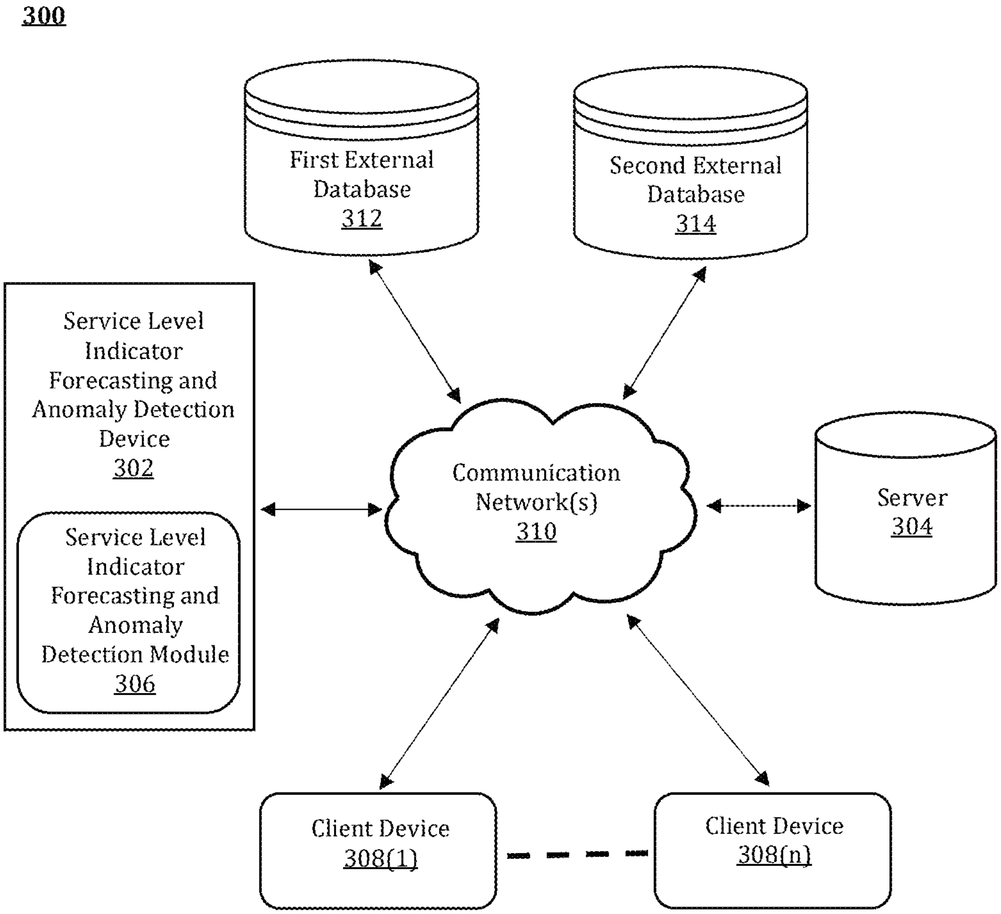
FIG. 3 illustrates a system diagram for implementing a method for forecasting of service level indicator metrics using deep learning algorithms in order to detect anomalies and to provide accurate alerts to users, in accordance with an embodiment.

FIG. 3 illustrates a system diagram for implementing an SLIFADD 302 having a service level indicator forecasting and anomaly detection module (SLIFADM), in accordance with an embodiment.

As illustrated in FIG. 3, the system 300 may include an SLIFADD 302 within which an SLIFADM 306 is embedded, a server 304, a first external database 312, a second external database 314, a plurality of client devices 308(1) . . . 308 (*n*), and a communication network 310.

In some embodiments, the SLIFADD 302 including the SLIFADM 306 may be connected to the server 304, and the database(s) 312 via the communication network 310. The SLIFADD 302 may also be connected to the plurality of client devices 308(1) . . . 308 (*n*) via the communication network 310, but the disclosure is not limited thereto.

In an embodiment, the SLIFADD 302 is described and shown in FIG. 3 as including the SLIFADM 306, although it may include other rules, policies, modules, databases, or applications, for example. In some embodiments, the first external database 312 and/or the second external database 314 may be configured to store ready to use modules written for each application programming interface (API) for all environments. Although only one database is illustrated in FIG. 3, the disclosure is not limited thereto. Any number of desired databases may be utilized for use in the disclosed invention herein. The databases 312, 314 may be a mainframe database, a log database that may produce programming for searching, monitoring, and analyzing machine-generated data via a web interface, etc., but the disclosure is not limited thereto.

In some embodiments, the SLIFADM 306 may be configured to receive real-time feed of data from the plurality of client devices 308(1) . . . 308 (*n*) and secondary sources via the communication network 310.

As may be described below, the SLIFADM 306 may be configured to: receive first information that relates to an incoming call volume for a first queue from among a plurality of queues; analyze, by using a first model, the first information in order to determine a plurality of SLI metrics that relate to the first queue; generate a forecast of a first SLI metric from among the plurality of SLI metrics for the first queue; and display, via a graphical user interface, information that relates to the forecast, but the disclosure is not limited thereto.

The plurality of client devices 308(1) . . . 308 (*n*) are illustrated as being in communication with the SLIFADD 302. In this regard, the plurality of client devices 308(1) 308(*n*) may be "clients" (e.g., customers) of the SLIFADD 302 and are described herein as such. Nevertheless, it is to be known and understood that the plurality of client devices 308(1) . . . 308 (*n*) need not necessarily be "clients" of the SLIFADD 302, or any entity described in association therewith herein. Any additional or alternative relationship may exist between either or both of the plurality of client devices 308(1) . . . 308 (*n*) and the SLIFADD 302, or no relationship may exist.

The first client device 308(1) may be, for example, a smart phone. Of course, the first client device 308(1) may be any additional device described herein. The second client device 308 (*n*) may be, for example, a personal computer (PC). Of course, the second client device 308 (*n*) may also be any additional device described herein. In some embodiments, the server 304 may be the same or equivalent to the server device 204 as illustrated in FIG. 2.

The process may be executed via the communication network 310, which may comprise plural networks as described above. For example, in an embodiment, one or more of the plurality of client devices 308(1) . . . 308 (*n*) may communicate with the SLIFADD 302 via broadband or cellular communication. Of course, these embodiments are merely exemplary and are not limiting or exhaustive.

The computing device 301 may be the same or similar to any one of the client devices 208(1)-208(*n*) as described with respect to FIG. 2, including any features or combination of features described with respect thereto. The SLIFADD 302 may be the same or similar to the SLIFADD 202 as described with respect to FIG. 2, including any features or combination of features described with respect thereto.

Figure 4:
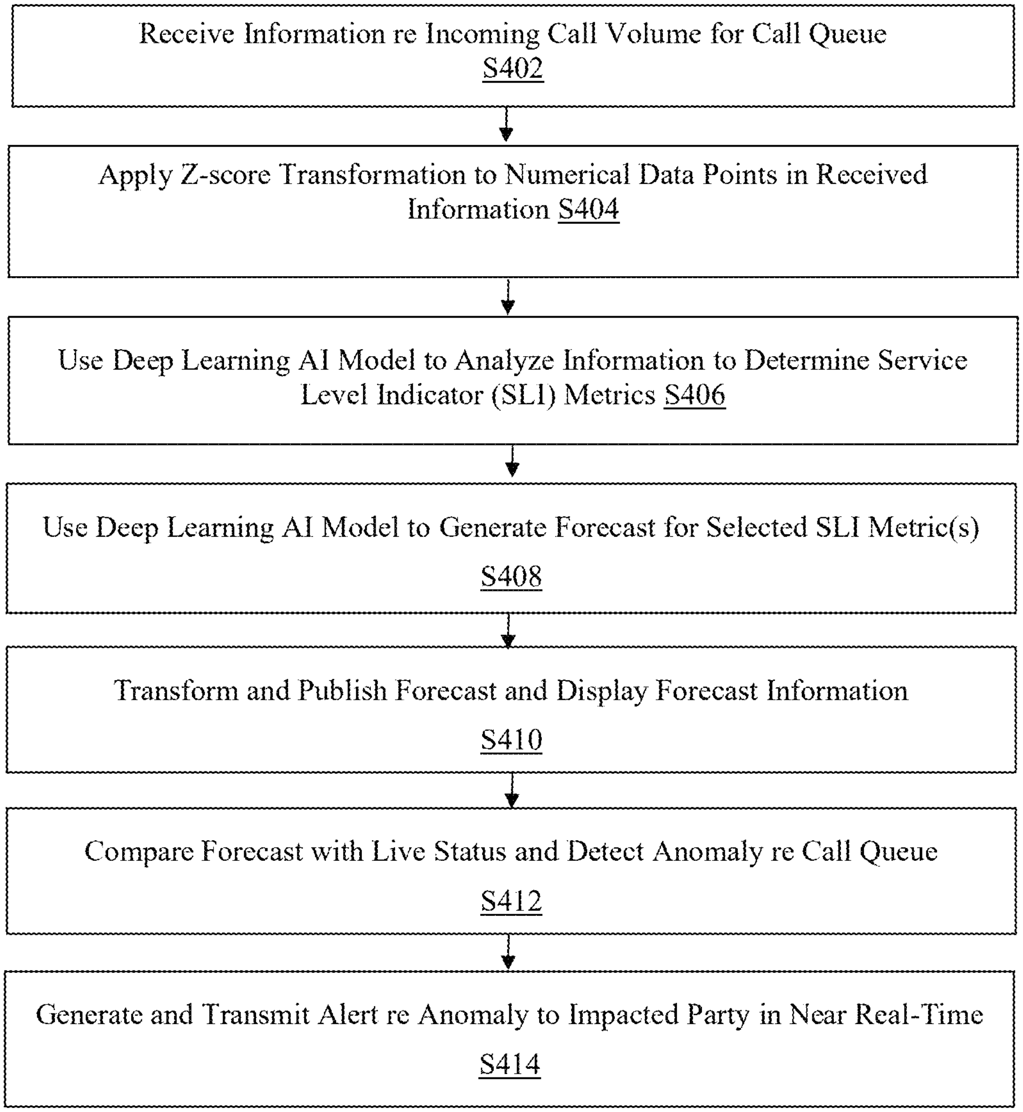
FIG. 4 illustrates an exemplary flow chart of a process for forecasting of service level indicator metrics using deep learning algorithms in order to detect anomalies and to provide accurate alerts to users, in accordance with an embodiment.

FIG. 4 illustrates an exemplary flow chart of a process 400 implemented by the SLIFADM 306 of FIG. 3 for enablement of a system and a method for forecasting of service level indicator metrics using deep learning algorithms in order to detect anomalies and to provide accurate alerts to users, in accordance with an embodiment. It may be appreciated that the illustrated process 400 and associated steps may be performed in a different order, with illustrated steps omitted, with additional steps added, or with a combination of reordered, combined, omitted, or additional steps.

As illustrated in FIG. 4, at step S402, the process 400 may include receiving first information that relates to an incoming call volume for a first queue from among a group of call queues that are handled by a customer contact center. In an embodiment, the customer contact center may be responsible for handling a large number of call queues, such as, for example, at least a dozen call queues, at least one hundred (100) call queues, at least five hundred (500) call queues, at least one thousand (1000) call queues, and/or any other number of call queues. In an embodiment, the group of call queues may include either or both of a private banking queue and a retail servicing queue, but the present disclosure is not limited thereto, and many other types of call queues are contemplated.

In an embodiment, the first information may include any one or more of an incoming call volume during a predetermined time interval, a time of day, a day of the week, information that relates to a seasonal event, and information that relates to an outage in at least one application from among a predetermined plurality of applications. For example, the first information may indicate incoming call volumes for a particular call queue based on whether it is a weekday, i.e., Monday through Friday, or a weekend day, i.e., Saturday or Sunday; and/or incoming call volumes during a particular time frame, such as between 8:00 am and 5:00 pm; and/or incoming call volumes during a particular seasonal event, such as a pre-holiday period.

At step S404, the process 400 may include preprocessing the received first information by applying a Z-score transformation to numerical data points included in the first information, and then by normalizing the transformed first information so that the scale thereof is suitable for subsequent processing.

At step S406, the process 400 may include developing and training a first deep learning artificial intelligence (AI) model to analyze the first information in order to determine a significance of each of a set of SLI metrics that relate to the first queue. In an embodiment, the set of SLI metrics may include any one or more of an incoming call volume, a number of calls waiting to be answered, a number of specialists currently on duty, an expected wait time in the call queue, a duration of an oldest call in the queue, an average handling time of a call in the queue, an efficiency of routing calls to a queue, and an effectiveness of an IVR self-service tool, and/or any other suitable type of SLI metric.

In an embodiment, the first model may include any one or more of a Long Short-Term Memory (LSTM) model, a Bidirectional LSTM model, a Stacked LSTM model, a Recurrent Neural Network (RNN) model, a Convolutional Neural Network (CNN) model, a multi-step dense model, and a linear regression model. However, the present disclosure is not limited to these types of models, and any other suitable model may be used.

In an embodiment, the first model may be trained by using historical data that is collected at predetermined periodic intervals over a predetermined time period. For example, the first model may be trained by using historical data that is collected at ten-minute intervals over a thirty day period. However, the present disclosure is not limited to any particular periodic interval or to any particular time period with respect to the training of any model.

At step S408, the process 400 may include using the deep learning AI model as developed and trained in step S406 to generate a forecast of a particular SLI metric for the first queue. In an embodiment, the particular SLI metric may be a projected incoming call volume for the first queue during a specific future time frame. However, any SLI metric included in the set of SLI metrics determined in S406 may be a suitable candidate metric for the forecast. Then, at step S410, the process 400 may include transforming, storing, and displaying information that relates to the forecast via a graphical user interface (GUI) that is viewable by a party that may be interested in and/or impacted by the forecast. In an embodiment, the information that relates to the forecast may be transformed for long-term consumption and stored in a JSON-like NoSQL nonrelational database for future retrospectives. Further, the information that relates to the forecast may include a graph or a chart that illustrates predicted values of the particular SLI metric over a specific interval of time, and/or a table that shows numerical values of the particular SLI metric.

At step S412, the process 400 may include detecting an anomaly that relates to the first queue based on the forecast generated in step S408. In an embodiment, the first model may detect an anomalous event based on complex weightages and interdependencies of the historical information used to train the first model, by detecting a significant deviation in the first information from what would be expected. In an embodiment, the detection of the anomaly may be based in part on any of several factors, such as a time of day, a day of the week, a seasonal event, current and historical status of SLI metrics, and/or a temporary outage. Then, at step S414, the process 400 may include generating and transmitting an alert that relates to the anomaly in near real-time to a predetermined user, such as, for example, an interested party and/or an entity that may be impacted by the anomaly.

In the fast-paced environment of large-scale contact centers, the number of calls in a queue is a critical indicator of customer service and operational excellence. Multiple variables can impact how many calls are waiting in the queue, which includes the number of specialists currently staffed, the volume of calls received, the efficiency of the system in routing calls to the appropriate queue, and the proper functioning of the IVR self-service tools.

In an embodiment, an objective of the present inventive concept is to address service level challenges in such a contact center by using advanced deep learning models to predict the volume of calls waiting in queues. In an embodiment, these challenges may be addressed by transforming production data for machine learning ingestion, providing the results of applying various deep learning models to a normalized time-series dataset, and comparing the outcomes of the models.

Contact center service levels may be evaluated using various key performance indicators (KPIs) and/or service level indicators (SLIs), such as the number of calls in the queue, the expected wait time in the queue, the duration of the oldest call waiting in the queue, the average speed of an answered call, and the handling time of a call. These KPIs may have close dependencies on each other, and any variation in one can impact many others. Furthermore, these KPIs may be influenced by numerous internal and external factors, such as the time of day, the day of the month, seasonal events such as Prime Day or Cyber Monday, and outages in internal and external applications used by a contact center.

In an embodiment, detecting anomalies or deviations from the norm in large numbers of queues in a particular contact center may be complex, because each type of queue may have different service level measurements based on the business needs of the queue. For instance, for a large financial institution such as a bank, a single abandoned call on a private banking queue may be considered a major impact, while the acceptable threshold for a retail servicing queue may be much more lenient.

In an embodiment, a dataset used for training and evaluation may include the following: a label that relates to a number of calls waiting in a particular queue; a first feature that relates to a timestamp; a second feature that relates to traffic; a third feature that relates to call volume; a fourth feature that relates to a total number of calls on an IVR system; a fifth feature that relates to calls served with the IVR system; a sixth feature that relates to calls that are forced to be transferred; a seventh feature that relates to calls that are transferred as a result of a customer action; an eighth feature that relates to a number of agents that are available; a ninth feature that relates to a number of agents that are ready; and a tenth feature that relates to a number of agents that are active. In an embodiment, the data is collected in ten-minutes intervals, i.e., six data points per feature per hour, and thirty days of historical data is used for training each deep learning model.

In an embodiment, the features include crucial time-based data such as time of day, day of the week, and other relevant factors. The label represents the number of callers waiting for an agent at a given time, thus making it a supervised learning problem.

In an embodiment, standardization may be a crucial preprocessing step when preparing raw production data for input into a deep learning model. In this aspect, a primary objective is to transform the features so that they have a standardized distribution, with a mean of zero and a standard deviation of one. This may be achieved through the Z-score transformation, which scales features by subtracting their mean and dividing by their standard deviation:

$$Z = \frac{x - \text{mean}}{std}$$

In an embodiment, normalization is another essential preprocessing step that may be used to prepare raw production data for model input. In this aspect, an objective is to ensure that the input features are on a comparable scale, which facilitates more effective training of the models.

In an embodiment, the types of models to be used may include any one or more of the following: 1) Baseline Prediction Model: A relatively simplistic model that predicts a the future value based on the last observed value. 2) Linear Regression Model: A traditional regression model that assumes a linear relationship between features and a target variable. 3) Dense Model: A feedforward neural network with densely connected layers. 4) Multi-Step Dense Model: An extension of the Dense model designed for multi-step time-series forecasting. 5) Convolutional Neural Network (CNN) Model: This type of model is often used for image recognition but may be adapted for time-series prediction. 6) Recurrent Neural Network (RNN) Model: This type of model includes a hidden state that is a function of all previous hidden states. RNNs are traditionally composed of only a single hidden layer, since deep learning occurs via recurring functions within the layer. 7) Long Short-Term Memory (LSTM) Model: As a subtype of the RNN, the Long Short-Term Memory model specializes in predictions of time-series data.

The models are trained and evaluated using a time-series cross-validation approach to ensure a robust performance assessment. Mean Absolute Error (MAE) and Root Mean Squared Error (RMSE) are chosen as evaluation metrics, emphasizing the accuracy of predictions.

Performance metrics for each model are obtainable based on the evaluation of their predictions on a holdout dataset. In an embodiment, the LSTM model consistently outperforms other models in terms of MAE and RMSE.

In an embodiment, the LSTM model is chosen for its ability to capture and remember long-term dependencies in sequential data. The architecture includes input layers for the features, LTSM layers for capturing temporal dependencies, and an output layer providing predictions for the number of callers waiting for an agent.

In an embodiment, traditional models such the Linear Regression model may fall short in capturing temporal dependencies present in time-series data, making them less suitable for contact center forecasting. In the context of time-series prediction tasks, deep learning models, specifically LSTMs, are well-suited to capture long-term dependencies, making them an attractive option.

In an embodiment, additional benefits of the LSTM model include the following: 1) Temporal Dependency Handling: LSTM models excel at capturing long-term dependencies in time-series data, thereby allowing the model to learn and adapt to patterns in contact center activity over time. 2) Feature Extraction: The LSTM model automatically learns relevant features from the input data, thereby reducing the need for manual feature engineering. 3) Adaptability: LSTM models can adapt to changing patterns and trends in contact center data, thereby providing more accurate predictions in dynamic environments.

Implementation Challenges: The use of LSTM models may also present any one or more of the following challenges: 1) Data quality and Preprocessing: Imbalances in contact center data, such as unusually high or low call volumes, may affect model training. To address these issues, proper preprocessing techniques such as resampling and/or weighting may be necessary. In addition, anomalies in the data, such as sudden spikes or drops in call volumes, may introduce noise. Handling such outliers appropriately during preprocessing may be crucial for model stability. 2) Hyperparameter Tuning: LSTM models involve several hyperparameters, such as the number of layers, hidden units, and learning rates. To select optimal hyperparameters, careful tuning may be required to balance model complexity and avoid overfitting or underfitting. 3) Long Training Times: Training deep learning models, especially LSTM models, may be computationally intensive and time-consuming. Efficient hardware resources and parallelization strategies may be necessary to mitigate long training times. 4) Interpretability: LSTM models are often considered black-box models, thereby making it challenging to interpret the learned representations. Ensuring model outputs align with domain knowledge may be crucial for building trust in the predictions.

Every effective deep learning model demands diligent tailoring throughout development and implementation. In an embodiment, the intelligent alerting solution described in the present disclosure offers a high degree of customization, allowing the model to evolve to address specific call center dynamics. In addition, the intelligent alerting model adapts to nuances in the contact center dataset for more accurate predictions and customizes thresholds for each line of business in which it is employed.

LSTM models excel in capturing temporal dependencies within time-series data, thereby providing a superior ability to predict call center volume patterns over time. This nuanced understanding sets the present inventive concept apart from static, non-recurrent models. Moreover, in an embodiment, the present inventive concept is designed to cater to the intricacies of call center operations, thereby ensuring tailored and relevant insights.

In some embodiments as disclosed above in FIGS. 1-4, technical improvements effected by the instant disclosure may include a platform for implementing a service level indicator forecasting and anomaly detection module configured for enablement of forecasting of service level indicator metrics using deep learning algorithms in order to detect anomalies and to provide accurate alerts to users, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium may be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, may be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for forecasting of service level indicator (SLI) metrics with respect to a customer contact center, the method being implemented by at least one processor, the method comprising:
- receiving first information that relates to an incoming call volume for a first queue from among a plurality of queues;
- analyzing, by using a first model, the first information in order to determine a plurality of SLI metrics that relate to the first queue;
- generating a forecast of a first SLI metric from among the plurality of SLI metrics for the first queue; and
- displaying, via a graphical user interface, second information that relates to the forecast,
- wherein the first information comprises the incoming call volume during a predetermined time interval, a time of day, a day of the week, third information that relates to a seasonal event, and fourth information that relates to an outage in at least one application from among a predetermined plurality of applications.

2. The method of claim 1, further comprising:
- detecting, based on the forecast, an anomaly that relates to the first queue;
- generating an alert that relates to the anomaly; and
- transmitting the alert to a predetermined user.

3. The method of claim 1, wherein the plurality of SLI metrics comprises at least two from among the incoming call volume, a number of calls waiting to be answered, a number of specialists currently on duty, an expected wait time in the queue, a duration of an oldest call in the queue, an average handling time of a call, an efficiency of routing calls to a queue, and an effectiveness of an interactive voice response (IVR) self-service tool.

4. The method of claim 1, wherein the first model comprises one from among a Long Short-Term Memory (LSTM) model, a Recurrent Neural Network (RNN) model, a Convolutional Neural Network (CNN) model, a multi-step dense model, and a linear regression model.

5. The method of claim 1, wherein the plurality of queues comprises at least five hundred (500) queues and includes at least one from among a private banking queue and a retail servicing queue.

6. The method of claim 1, wherein the first model is trained by using historical data that is collected at ten-minute intervals over a thirty day period.

7. The method of claim 1, further comprising: prior to the analyzing, applying a respective Z-score transformation to each numerical data point included in the first information.

8. A computing apparatus for forecasting of service level indicator (SLI) metrics with respect to a customer contact center, the computing apparatus comprising:
- a processor;
- a memory;
- a display; and
- a communication interface coupled to each of the processor, the memory, and the display,
- wherein the processor is configured to:
  - receive, via the communication interface, first information that relates to an incoming call volume for a first queue from among a plurality of queues;
  - analyze, by using a first model, the first information in order to determine a plurality of SLI metrics that relate to the first queue;

generate a forecast of a first SLI metric from among the plurality of SLI metrics for the first queue; and cause the display to display, via a graphical user interface, second information that relates to the forecast, wherein the first information comprises the incoming call volume during a predetermined time interval, a time of day, a day of the week, third information that relates to a seasonal event, and fourth information that relates to an outage in at least one application from among a predetermined plurality of applications.

9. The computing apparatus of claim 8, wherein the processor is further configured to:

detect, based on the forecast, an anomaly that relates to the first queue;

generate an alert that relates to the anomaly; and transmit the alert via the communication interface to a predetermined user.

10. The computing apparatus of claim 8, wherein the plurality of SLI metrics comprises at least two from among the incoming call volume, a number of calls waiting to be answered, a number of specialists currently on duty, an expected wait time in the queue, a duration of an oldest call in the queue, an average handling time of a call, an efficiency of routing calls to a queue, and an effectiveness of an interactive voice response (IVR) self-service tool.

11. The computing apparatus of claim 8, wherein the first model comprises one from among a Long Short-Term Memory (LSTM) model, a Recurrent Neural Network (RNN) model, a Convolutional Neural Network (CNN) model, a multi-step dense model, and a linear regression model.

12. The computing apparatus of claim 8, wherein the plurality of queues comprises at least five hundred (500) queues and includes at least one from among a private banking queue and a retail servicing queue.

13. The computing apparatus of claim 8, wherein the first model is trained by using historical data that is collected at ten-minute intervals over a thirty day period.

14. The computing apparatus of claim 8, wherein the processor is further configured to: prior to the analysis, apply a respective Z-score transformation to each numerical data point included in the first information.

15. A non-transitory computer readable storage medium storing instructions for forecasting of service level indicator (SLI) metrics with respect to a customer contact center, the storage medium comprising executable code which, when executed by a processor, causes the processor to:

receive first information that relates to an incoming call volume for a first queue from among a plurality of queues;

analyze, by using a first model, the first information in order to determine a plurality of SLI metrics that relate to the first queue;

generate a forecast of a first SLI metric from among the plurality of SLI metrics for the first queue; and display, via a graphical user interface, second information that relates to the forecast, wherein the first information comprises the incoming call volume during a predetermined time interval, a time of day, a day of the week, third information that relates to a seasonal event, and fourth information that relates to an outage in at least one application from among a predetermined plurality of applications.

16. The storage medium of claim 15, wherein when executed, the executable code further causes the processor to:

detect, based on the forecast, an anomaly that relates to the first queue;

generate an alert that relates to the anomaly; and transmit the alert to a predetermined user.

17. The storage medium of claim 15, wherein the plurality of SLI metrics comprises at least two from among the incoming call volume, a number of calls waiting to be answered, a number of specialists currently on duty, an expected wait time in the queue, a duration of an oldest call in the queue, an average handling time of a call, an efficiency of routing calls to a queue, and an effectiveness of an interactive voice response (IVR) self-service tool.

* * * * *